J. C. HOLLANDS.
BROILER.
APPLICATION FILED APR. 22, 1916.
1,257,234.
Patented Feb. 19, 1918.
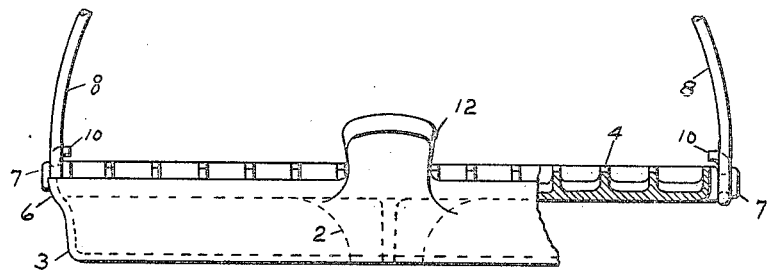
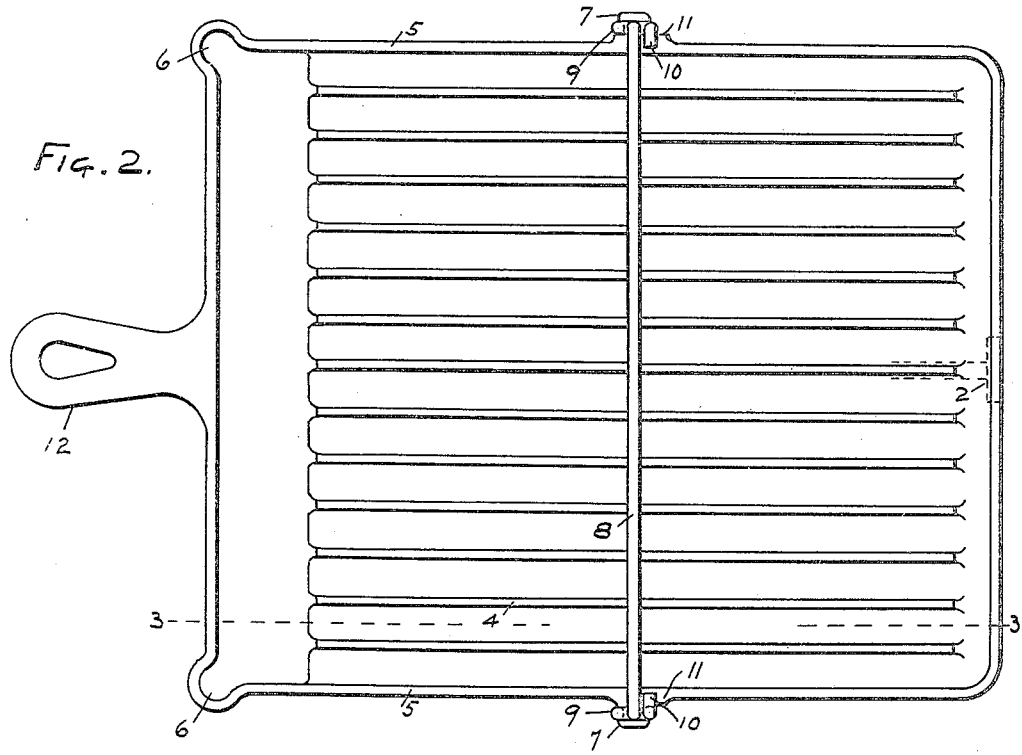
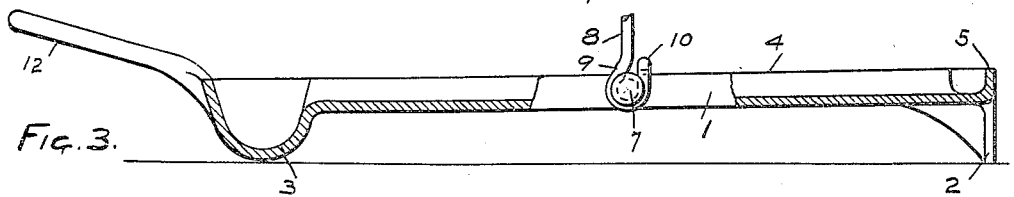
Inventor
John C. Hollands

UNITED STATES PATENT OFFICE.

JOHN C. HOLLANDS, OF ERIE, PENNSYLVANIA, ASSIGNOR TO THE GRISWOLD MANUFACTURING COMPANY, OF ERIE, PENNSYLVANIA, A CORPORATION OF PENNSYLVANIA.

BROILER.

1,257,234.        Specification of Letters Patent.      Patented Feb. 19, 1918.

Application filed April 22, 1916. Serial No. 92,850.

*To all whom it may concern:*

Be it known that I, JOHN C. HOLLANDS, a citizen of the United States, residing at Erie, in the county of Erie and State of Pennsylvania, have invented new and useful Improvements in Broilers, of which the following is a specification.

This invention relates to broilers and consists in certain improvements in the construction thereof as will be hereinafter fully described and pointed out in the claims.

The object of the invention is to form a broiler readily adaptable for use on the top of a stove, ordinarily a gas stove and one that will readily collect the drippings and have convenient means for handling the broiler to dispose of the drippings.

The invention is illustrated in the accompanying drawings as follows:—

Figure 1 is an end elevation of the broiler.

Fig. 2 a plan view of the same.

Fig. 3 a section on the line 3—3 in Fig. 2.

1 marks the broiler plate. It has the leg 2 at one end and the drip receptacle or trough 3 at the opposite end, the bottom of the trough 3 forming a support for the plate and the leg 2 being of such a height as to give the plate a slight inclination toward the trough. Ribs 4 extend upwardly from the plate 1, the channels between the ribs emptying into the receptacle 3. A closure shoulder 5 extends entirely around the plate merging with the walls of the receptacle 3 at the end. Spouts 6 are provided at the ends of the receptacle 3, the receptacle 3 being closed so as to receive and retain the drippings and the openings from these troughs are, therefore, above the bottom of the receptacle.

Lugs 7 extend from the sides of the plate and the bail 8 is pivotally mounted on these lugs, the bail having an eye 9 in its end for this purpose. The end 10 of the eye is bent inwardly and engages a lug 11 on the side of the plate thus limiting the pivotal movement of the bail. The lugs 7 are at the opposite side of the center of gravity from the receptacle 3 so that when the broiler is lifted by the bail the tilting of the broiler is slightly increased toward the receptacle and the end 10 limits this tilting movement. A handle 12 is also provided and this extends from the receptacle 3 and with the bail forms a convenient means by which the drippings which have collected in the receptacle may be poured from one or the other of the spouts 6. It will be understood that these features are important in that when the receptacle is emptied the broiler is ordinarily very hot.

What I claim as new is:—

1. In a broiler, the combination of a plate having its upper surface ribbed, the channels between the ribs terminating at one end in a trough-like receptacle extending transversely of said ribs and adapted to receive and retain the drippings from the channels; and a bail for the plate arranged at the opposite side of the center of gravity from the receptacle.

2. In a broiler, the combination of a plate having its upper surface ribbed, the channels between the ribs terminating at one end in a trough-like receptacle extending transversely of said ribs and adapted to receive and retain the drippings from the channels; a bail for the plate arranged at the opposite side of the center of gravity from the receptacle; and a stop limiting the pivotal movement of the bail so as to give to the plate when suspended by the bail a tilted direction toward the receptacle.

3. In a broiler, the combination of a plate having its upper surface ribbed, the channels between the ribs terminating at one end in a trough-like receptacle extending transversely of said ribs and adapted to receive and retain the drippings from the channels; a bail for the plate arranged at the opposite side of the center of gravity from the receptacle; and a handle extending from the receptacle.

In testimony whereof I have hereunto set my hand.

JOHN C. HOLLANDS.